(12) United States Patent
Horst (10) Patent No.: US 6,813,409 B2
(45) Date of Patent: Nov. 2, 2004

(54) FREE-SPACE NON-BLOCKING SWITCH

(75) Inventor: Folker Horst, Zurich (CH)

(73) Assignee: International Business Machines Corporation, Armonk, NY (US)

(*) Notice: Subject to any disclaimer, the term of this patent is extended or adjusted under 35 U.S.C. 154(b) by 134 days.

(21) Appl. No.: 10/268,640

(22) Filed: Oct. 10, 2002

(65) Prior Publication Data

US 2004/0071390 A1 Apr. 15, 2004

(51) Int. Cl.[7] .............................................. G02B 6/26
(52) U.S. Cl. ...................................................... 385/17
(58) Field of Search ............................... 385/17, 24, 42,
385/15, 16, 18, 130, 10, 28, 31, 37, 39,
40, 142; 398/96, 103, 118, 124

(56) References Cited

U.S. PATENT DOCUMENTS

| | | | | |
|---|---|---|---|---|
| 5,239,598 A | * | 8/1993 | Wight et al. ..................... | 385/8 |
| 5,943,454 A | * | 8/1999 | Aksyuk et al. ................. | 385/22 |
| 6,002,818 A | * | 12/1999 | Fatehi et al. .................... | 385/17 |
| 6,268,952 B1 | * | 7/2001 | Godil et al. .................... | 359/291 |
| 6,289,152 B1 | * | 9/2001 | Zhang et al. ................... | 385/33 |
| 2001/0006569 A1 | * | 7/2001 | Lin .................................. | 385/18 |

* cited by examiner

Primary Examiner—John R. Lee
Assistant Examiner—James P. Hughes (74) Attorney, Agent, or Firm—Wan Yee Cheung (57) ABSTRACT

An optical switch comprises input channels with input optical free-space elements, an intermediate optical free-space element, and input tunable optical lenses with adjustable projection characteristic for projecting lightwaves received from the input optical free-space elements into the intermediate optical free-space element. The switch further comprises output channels with output optical free-space elements, and output tunable optical lenses with adjustable reception characteristic for capturing the lightwave from the intermediate optical free-space element and for feeding the lightwave to the output optical free-space elements. The optical switch can be integrated into a substrate. The tunable lens can be implemented with an individually tunable heater. By adjusting the heaters one can control the projection characteristic of the light beam emitted into a free-space element. Also an asymmetrical switch arrangement is possible. The switch can be implemented such that its input side is a mirror image of its output side. A high-index-contrast silica-on-silicon integrated planar waveguide technology allows to make the waveguides with small bending radii and the switch design can be further optimized to reduce the lateral size. By slightly defocusing the tunable lens on the input side and/or the tunable lens on the output side, the power throughput to the output channel can be varied without introducing crosstalk to other channels. The switches thus can also be used to adjust the power in the output channels. The heater steering unit may comprise a unit that allows the adjustment of the power in the output channel.

20 Claims, 6 Drawing Sheets

FREE-SPACE NON-BLOCKING SWITCH

TECHNICAL FIELD

The invention concerns an optical switch, and in particular a non-blocking free-space switch.

BACKGROUND OF THE INVENTION

The tantalizing prospect of utilizing optical wiring in a Silicon-based electronic environment becomes ever more attractive as speed, complexity and integration density increase. Tremendous incentives are increasingly apparent for the development of optical and optoelectronic devices that are compatible with VLSI (Very Large Scale Integrated) Silicon (Si) technology. Large-area and low-cost Si wafer technology provides an ideal platform for photonic guided-wave devices. In addition, mature Si processing technology, micromachining techniques, Silicon-on-Insulator (SOI) and heteroepitaxy, can be used to fabricate complex optical structures such as micro-optical devices and hybrid optoelectronics. Compatibility with mainstream Si Integrated Circuit (IC) technology promises low cost and reliable manufacturing of monolithic Si-based optoelectronic integrated circuits that will be much like today's electronic ICs.

Optical switches, very much like the conventional transistor, are essential components of photonic guided-wave devices. Optical switching is used for rearranging the optical paths in a telecommunication network, for example.

Most optical switches have one or more elements that are mechanically actuated. These kind of switches are thus referred to as optomechanical switches. Typical examples are addressed in "Current European WDM deployment trends", E. Lowe, IEEE Commun. Mag., Vol. 36, pp. 46–50, 1998, and in "All-silicon bistable micro mechanical fiber switches", M. Hoffmann et al., Electron. Lett., Vol. 34, pp. 207–208, 1998.

It is desirable to have optical switches that are less bulky and more reliable than optomechanical switches. An often followed approach to build an N×M optical switch is to cascade a (large) number of simple 2×2 optical switching elements, where each of these 2×2 switches consists of one or two tunable Mach-Zehnder interferometers. An example of such a switch is described in "Low-Loss and High-Extinction-Ratio Silica-Based Strictly-Nonblockling 16×16 Thermooptic Matrix Switch", T. Goh, M. Yasu, K. Hattori, A. Himeno, M. Okuno and Y. Ohmori, IEEE Photonics Technology Letters, Vol. 10, No. 6, June 1998. A second approach, which uses beam-steering to realize a 1×N or N×1 switch is described in "Compact Versatile Thermooptical Space Switch Based on Beam Steering by a Waveguide Array", E. Flück et al., IEEE Photonics Techn. Lett., Vol. 11, No. 11, pp. 1399–1401, November 1999. This integrated optical switch is similar to an arrayed waveguide grating (AWG) wavelength multiplexer. It consists of a number of input waveguides, a star coupler that divides the input light over an array of channel waveguides and a second star coupler that refocuses the light from the array onto one of the output waveguides. The array waveguides at the input side are equipped with tunable lenses. By adjusting the phase distribution one can determine onto which output waveguide the light is focussed. This allows to switch input signals to desired output channels. This IEEE publication is herewith incorporated by reference.

SUMMARY OF THE INVENTION

It is an object of the invention to provide a switch which is simple and inexpensive to fabricate and which switches light paths rapidly and without frictional wear to the switch.

It is another object of the invention to provide a switch which can be integrated with other components, e.g., optical components, on a substrate.

The invention concerns optical switches and data transmission systems comprising one or more such switches. A switch, in accordance with the invention, comprises an input channel with an input optical free-space element, an intermediate optical free-space element, an input tunable optical lens with adjustable projection characteristic for projecting a lightwave received from the input optical free-space element into the intermediate optical free-space element. In addition, the switch comprises an output channel with an output optical free-space element, and an output tunable optical lens with adjustable reception characteristic for capturing the lightwave from the intermediate optical free-space element and for feeding the lightwave to the output optical free-space element.

DESCRIPTION OF THE DRAWINGS

The invention is described in detail below with reference to the following schematic drawings. It is to be noted that the Figures are not drawn to scale.

DESCRIPTION OF PREFERRED EMBODIMENTS

Before different embodiments of the invention are described, the basic elements and building blocks as well as the underlying integrated planar waveguide technology, in accordance with the invention, are addressed.

The switch can be implemented in various material systems including Silicon oxinitride (SiON), III–V semiconductors like InP, silica (i.e., $SiO_2$) glasses, lithiumniobate, and polymers.

Optical waveguides are employed that guide lightwaves to the switch and away from the switch. An optical waveguide usually comprises a core made of some high-refractive index material and a cladding of a low-refractive index material. The core and cladding may be made of doped silica glass, where the necessary refractive index contrast is achieved by an appropriate doping profile. For mass production it is desirable to fabricate the waveguides on a semiconductor technology compatible substrate, such as a Si wafer (e.g., a four inch Si wafer), or on a glass substrate. This results in what is called a planar waveguide or an integrated planar waveguide. A review on planar waveguide technology is given in "Silica-based optical integrated circuits", by Y. P. Li, C. H. Henry, IEE Proc.-Optoelectron. Vol. 143, No. 5, pp. 263–280, October 1996.

If the cladding is made of silica, which has a refractive index of 1.45, for the core a material with a higher refractive index (e.g., near 1.5) is desired. A higher index gives smaller devices, but also higher loss, more difficult fiber-to-chip-coupling etc. SiON can be chosen for the core, because its refractive index can be tuned over a wide range by changing the nitrogen concentration of the material. An example for use of SiON as waveguide is described in U.S. Pat. No. 5,416,861.

In "Plasma-enhanced growth, composition and refractive index of SiON films" by K. E. Mattsson in J. Appl. Phys.77, No. 12, 15 Jun. 1995, pp. 6616–6623, the variation of nitrogen in SiON for changing the refractive index is examined.

A particular feature of $SiO_xN_y$ resulting from a mixture of the components $SiO_2$ and $Si_3N_4$ is that it forms amorphous structures and that the components are miscible over the whole possible range. A typical composition of the waveguide core is $SiO_{19}N_{008}$.

A fabrication technique is to deposit SiON using a Plasma Enhanced Chemical Vapor Deposition (PECVD) process. The resulting material has, however, a large hydrogen concentration. Hydrogen is incorporated in the form of hydroxyl groups, Si—H groups and NH— and $NH_2$-fragments. These groups and fragments introduce additional absorption into the optical transmission characteristic of the silicon oxinitride. The first overtone of the NH-induced absorption band lies at 1505 nm and overlaps with the spectral window, which is used for optical signal transmission and which extends from 1540 nm to 1570 nm, hereinafter simply referred to as the optical transmission window. This window has been chosen for optical transmission due to the fact that silica glass there has its lowest absorption and that erbium-doped optical amplifiers there have the range of most linear amplification as can be read upon in "Review of rare earth doped fiber lasers and amplifiers" by P.Urquhart, IEE Proc. Vol. 135, Pt. J, No. 6, pp 385–407, December 1988.

This absorption results in often unacceptably large losses for viable products. The NH concentration may even increase with time and humidity due to natural exchange with the surrounding medium. The hydrogen concentration and with it the resulting absorption losses are therefore currently reduced by a high-temperature annealing process as described in "High contrast and low loss SiON optical waveguides by PECVD", by B. Offrein et al. in Proceedings 1996 Symposium of the IEEE/LEOS Benelux Chapter, Enschede, pp. 290–293, which process consolidates the material, and reduces the hydrogen concentration by evaporating water and ammonia. This document is incorporated herein by means of reference. The nitrogen atoms change their atomic neighborhood from two silicon atoms and one hydrogen atom to three silicon neighbors. The losses can however be reduced only to a certain extent, because longer annealing times are assumed to produce additional scattering centers, which is ascribed to crystallization or phase separation. Another approach to reduce the hydrogen content in SiON is described in "Low-Hydrogen Silicon Oxynitride Optical Fibers Prepared by SPCVD" by Dianov et al. in Journal of lightwave technology, Vol. 13, No. 7, July 1995.

A well suited, special class of SiON materials is disclosed in the co-pending PCT patent application PCT/IB98/01017, with International Publication number WO 99/44937. This PCT patent application is incorporated by reference.

The following embodiments will be illustrated in connection with a high-index-contrast silica-on-silicon integrated planar waveguide technology which allows to make low-cost silica on silicon integrated planar lightwave components for optical networks. This integrated planar waveguide technology makes use of a large effective refractive index contrast that can be achieved in waveguides formed by SiON and $SiO_2$. This enables the realization of waveguides with small bending radii and thus considerable device miniaturization.

Details of the high-index-contrast silica-on-silicon technology are addressed in "Wavelength division multiplexed add/drop ring technology in corporate backbone networks", G. L. Bona et al., Opt. Eng. Vol. 37, pp. 3218–3228, 1998. This document is herein incorporated by reference.

Figure 9:
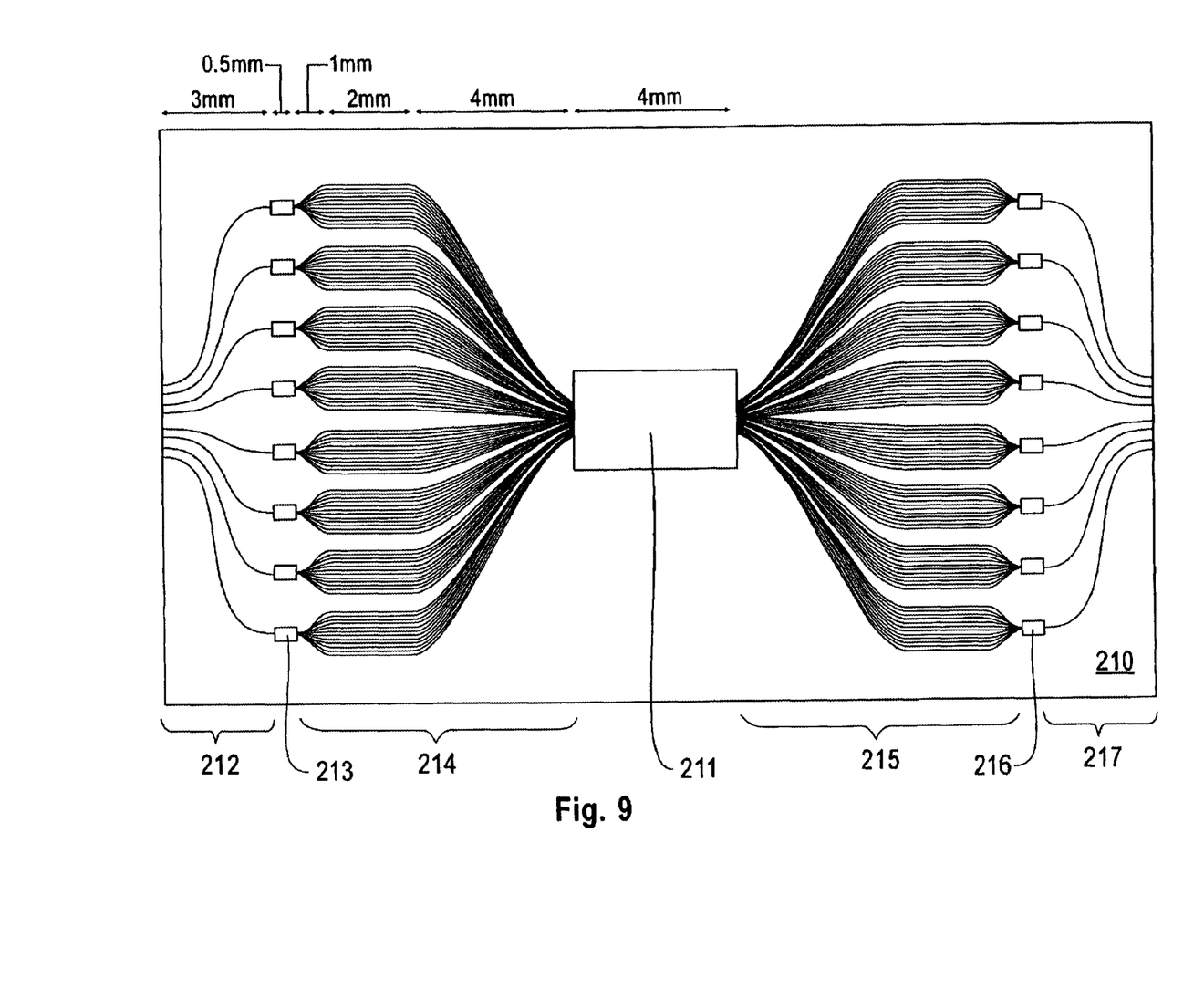
FIG. 9 is a schematic top view of a seventh switch.

The term "waveguide array", as herein used, is meant to refer to an array of channel waveguides. Ridge waveguide (also called stripe waveguide) structures, buried waveguide structures and any other structure is well suited for use in connection with the invention. For the array waveguides a number of different shapes and geometry can be applied. In the Figures for sake of simplicity only waveguide arrays with straight waveguide channels are shown. In most practical applications these waveguide channels are bent, as shown in FIG. 9, for example.

The word "channel" refers to one particular link of a communication link that carries a multiwavelength lightwave.

An intermediate optical free-space element has a free propagation region where light is substantially not laterally confined. Light can be projected from an input waveguide (herein referred to an input channel) or input waveguide array into such an intermediate optical free-space element. Optical free-space elements are in the literature also referred to as free propagation regions (FPRs). We herein make a distinction between input optical free-space elements, intermediate optical free-space elements, and output optical free-space elements. This is an artificial distinction which is merely introduced in order to be able to better describe the different components of a switch, their arrangement, and their function.

A "tunable lens", as herein used, comprises a waveguide array plus phase shifters (e.g., heaters). This tunable lens takes a divergent or parallel beam propagating in a first optical free-space element (e.g., an input optical free-space element) and transforms this beam into a parallel or convergent beam in a second optical free-space element, just like a normal lens would do. For the purpose of the description, everything between the first optical free-space element and the second optical free-space element makes up the tunable lens.

The focusing properties of the waveguide array and the wavelength dependency are determined by the relative effective optical lengths of the waveguides in the waveguide array. This effective optical length is determined by the effective index of refraction and the physical length of the waveguide. It can be fine-tuned using the phase shifters (e.g., heaters).

The substitution of a normal lens, which applies a continuous phase modulation to a continuous wavefront, by a waveguide array, which applies a discrete number of phase shifts to a discrete number of sub-waves, introduces extra losses and spurious diffracted light beams. These effects, and the way to minimize them, are well known to a person skilled in the art of AWG design. In general, the more waveguides the array consists of, the better it approximates a continuous lens, and the less important these side-effects are. However, with more waveguides in an array, more phase shifters (e.g., heaters) are used for controlling the tunable lens.

This holds for the herein described SiON technology where one uses the heaters also to correct spurious phase errors in the waveguides. However, if one uses a very well controlled technology, without these phase errors, it is possible to employ only two heaters: one to apply linear phase gradients (steering) and one to apply quadratic phase gradients (focal distance) with many array waveguides.

A tunable lens can be implemented in different manners. A typical example is a tunable lens that comprises an individually tunable heater for some or all of the waveguides of a waveguide array. Under certain circumstance it is desirable to employ more than one heater per waveguide.

By adjusting the heaters one can control the projection characteristic of the light beam emitted into a free-space element. Depending on the implementation one can either adjust the focal point (focal distance) or the direction of light emission (steering), or both at the same time. A linear phase gradient leads to a tilting (steering) of the phase front of the light emitted. With quadratic or higher order phase gradients one can change the focal distance of the lightwave. In other words, such a tunable lens allows a thermooptical control of the projection characteristic.

Well suited are heaters that comprise chromium pads or lines that are placed close to the waveguide that is to be influenced. Aluminum leads can be used to drive current through the chromium pads or lines. A current or voltage source is used for driving the individual heaters. Such a current or voltage source and other elements/circuits can be part of a heater steering unit. Such a heater steering unit may comprise a microcomputer and a memory to store the respective heater settings, or it may be connected to a switch control box or a computer (e.g., via a computer interface). A switch control box obtains/extracts routing or switching information (connection information) either from the packets or frames received on the input side of the switch, or this connection information is received from other systems. The respective connections are then established inside the switch/optical chip via the heater steering unit and the input- and output tunable lenses.

In order to find the optimum heater settings corresponding to the various switch states, one can use an iterative optimization procedure. Well suited is a Levenberg-Marquard algorithm, as described in "Numerical Recipes in C: The Art of Scientific Computing", Cambridge, Cambridge Univ. Press, pp. 683–688, 1988. The respective heater settings can be stored so that they can be recalled to change the switch state(s). Such a reconfiguration can be done in the ms range.

Micromechanical on-chip elements can also be used to realize a tunable lens.

The basic elements of a switch are: an input optical free-space element, an input tunable lens, an intermediate optical free-space element, an output tunable lens, and an output optical free-space element.

The path for a connection through the switch is as follows: light from an input channel is launched into an input optical free-space element and becomes a laterally divergent beam. This divergent beam is picked up by the first tunable lens (waveguide array plus heaters) and transformed into a parallel or convergent beam in the intermediate optical free-space element. At the end of this intermediate optical free-space element the beam is still parallel, or divergent again (past the local point). This parallel or divergent beam is picked up by the second tunable lens (second waveguide array plus heaters) and transformed into a convergent beam in the output optical free-space element. The position of the focal point in this element is adjusted such that it coincides with the start of the output waveguide. The light is then coupled into this output waveguide and leaves the switch through it.

The N×N switching functionality is obtained by adjusting the input tunable lens to steer the direction of the beam in the intermediate optical free-space element. For a number of different settings, this beam can be pointed into the direction of a number of different output tunable lenses. In the same way, the output tunable lenses can be adjusted such that for a number of different settings, beams coming from different input tunable lenses are projected onto the waveguides of the output waveguide arrays.

An optimal link between a given input waveguide P and a given output waveguide Q is made when:

a) the input tunable lens P is set to point the transmitted beam into the direction of the output tunable lens Q, and b) the output tunable lens Q is set to focus a beam coming from the input tunable lens P onto the output waveguide Q, and c) Either: c1) The focal length of the input tunable lens P is set to transmit a parallel beam in the intermediate optical free-space element and the output tunable lens Q is set to refocus such a parallel beam onto the output waveguide.

Or: c2) The focal length of the input tunable lens P is set to transmit a convergent beam with a focal point in the intermediate optical free-space element half-way between the input and the output tunable lenses, and the output tunable lens Q is set to refocus the divergent beam after this focal point onto the output waveguide.

If the directions or the focal distances of the tunable lenses slightly deviate from the above mentioned scenarios, there might still be some coupling, but with less than optimum coupling efficiency. This can be used for power adjustments.

Optical properties of the switches are the transmission loss, output channel loss uniformity, channel isolation, etc. Given a fixed waveguide technology, the free design parameters that can be used to adjust properties of the switch are well known and understood by a person of skill in the art. Analytical as well as numerical modeling or simulation tools can be used when designing the switch. This procedure follows the same considerations as applied when modeling standard AWG devices.

Figure 1A:
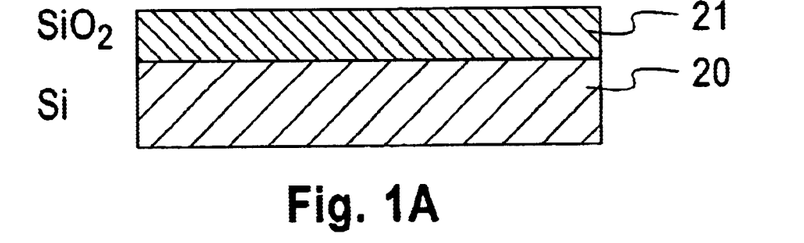
FIGS. 1A–1F is a sequence of schematic cross-sections illustrating the fabrication of a ridge waveguide structure.
Figure 1B:
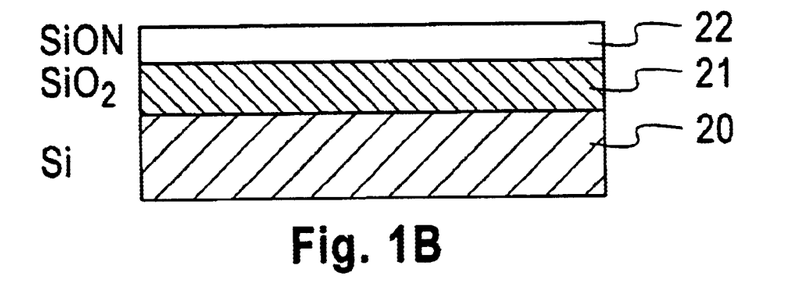
Figure 1C:
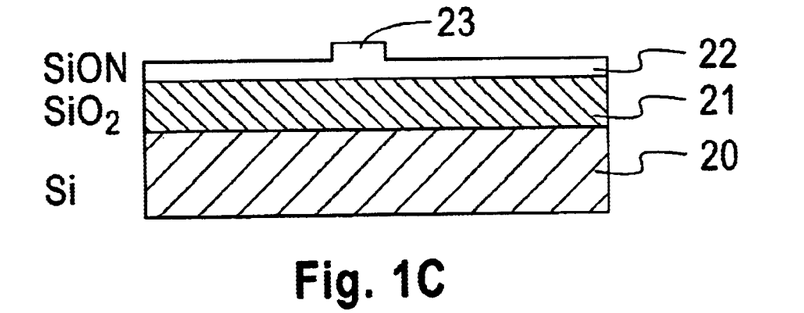
Figure 1D:
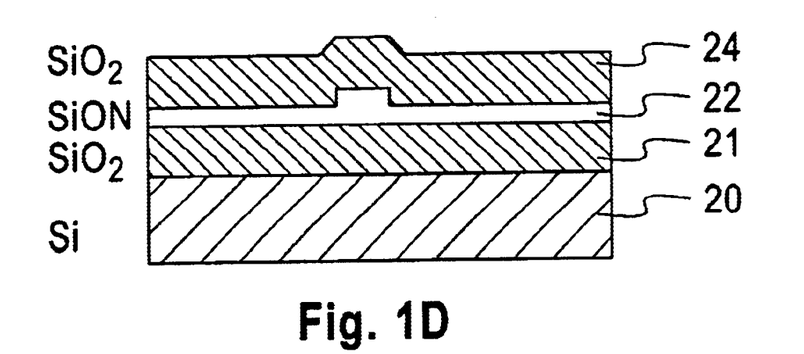
Figure 1E:
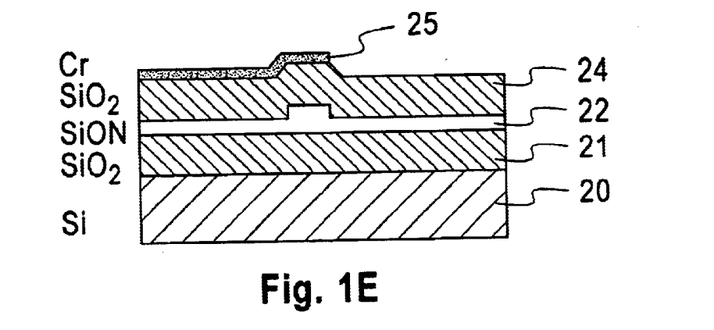
Figure 1F:
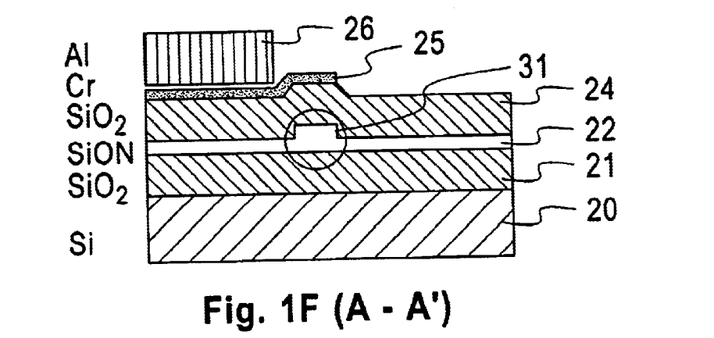

An exemplary cross-section of a waveguide with a ridge structure is shown schematically in FIG. 1F. For the fabrication different steps are performed, as illustrated in FIGS 1A–1F. A Si substrate 20 (e.g., a Si wafer) is thermally oxidized to form a $SiO_2$ layer 21 (also referred to as lower cladding), as shown in FIG. 1A. In a subsequent step, a SiON core 22 is grown by using a PECVD process. The result of this PECVD step is illustrated in FIG. 1B. The whole structure 20, 21, 22 may now be annealed in an annealer to reduce absorption losses caused by N—H bonds. A Tempress System TS-6304 can be used as annealer. As indicated in FIG. 1C, a ridge 23 is now defined by means of a Reactive Ion Etching (RIE) process. For this purpose one can use $CHF_3$ and $O_2$ as reactants. This ridge 23 is supposed to serve as waveguide channel. Now an upper cladding layer 24 is formed on top of the SiON core 22 and ridge 23. The upper cladding layer 24 comprises $SiO_2$ that was deposited using PECVD. FIG. 1D illustrates a waveguide after this upper cladding layer 24 was deposited.

Some additional steps are performed in order to form a chromium heater, for example. These additional steps are illustrated in FIGS. 1E–1F. As indicated in FIG. 1E, a chromium layer 25 is deposited on the upper cladding layer 24 so that it covers part of the. A sputter deposition process can be used to form the chromium layer 25. An additional aluminum layer 26 can be deposited by sputtering to form a low-resistance contact line. This is illustrated in FIG. 1F.

The waveguide has a ridge width between 1 $\mu$m and 5 $\mu$m, preferably 3 $\mu$m, and a thickness between 1 $\mu$m and 3 $\mu$m, preferably of 1.3 $\mu$m. The original thickness of the SiON layer 22 (FIG. 1B) is between 1 $\mu$m and 5 $\mu$m, and preferably about 2 $\mu$m. After the ridge formation this layer 22 is reduced to a thickness of about 0.65 $\mu$m (FIG. 1C). The SiO$_2$ cladding layers 21 and 24 have a refractive index of about 1.45 and the SiON core 22 has a refractive index of about 1.5. The index contrast is thus about 3.3%. The waveguides have a propagation loss of less than 0.15 dB/cm. When using the above-described high-index-contrast silica-on-silicon integrated planar waveguide technology, waveguides can be realized that have a relatively small geometrical cross-section and a high lateral effective refractive-index contrast of 0.02 compared to standard single mode fibers.

Figure 2A:
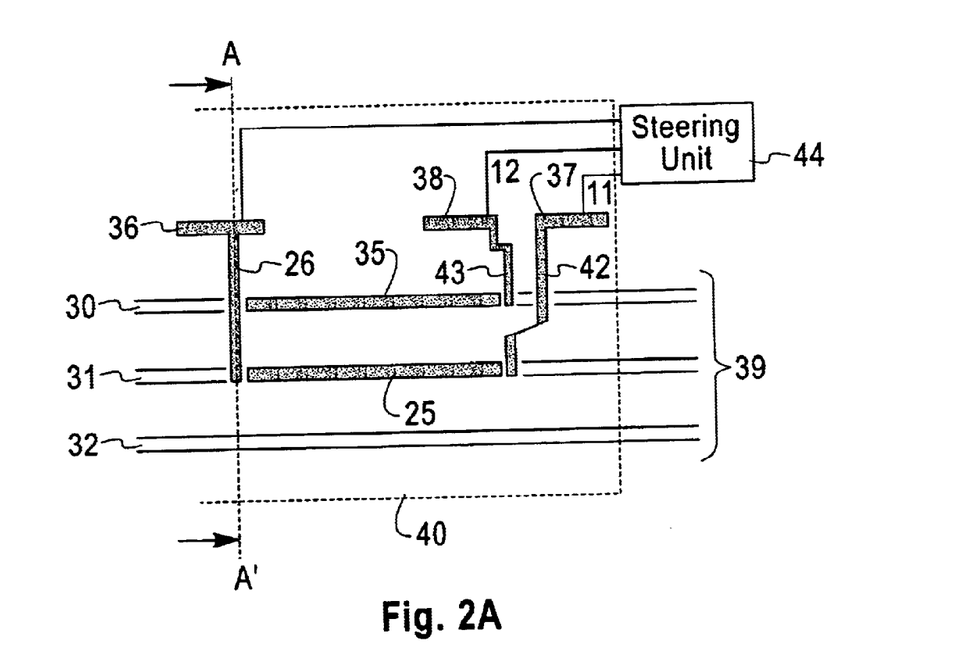
FIG. 2A is a schematic top view of a tunable optical lens.

An exemplary top-view of a tunable lens 40 is illustrated in FIG. 2A. The tunable lens 40 comprises a waveguide array 39 with three ridge waveguides 30, 31, and 32. The light is channeled along these waveguides from left to right. Two chromium heaters 25 and 35 are arranged on top of the two uppermost waveguides 30, 31. The two heaters 25, 35 are connected by a first aluminum contact line 26 to a first contact pad 36. This first aluminum contact line 26 serves as a common electrode. Each of the two heaters 25, 35 also has its individual aluminum contact line 42, 43 and contact pad 37, 38. This arrangement of aluminum contact lines allows to individually drive current (I1, I2) through the two heaters 25, 35. A steering unit 44 can be employed that drives the individual heaters. These heaters 25, 35 are part of the tunable lens 40 that allows to adjust the phase gradient across the different waveguides. By adjusting the phase gradient one can control the projection characteristic of the light emitted by the waveguide array 39 into an intermediate optical free-space element (not shown in FIG. 2A).

Figure 2B:
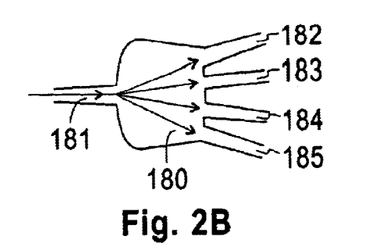
FIG. 2B is a schematic top view of an input optical free-space element.

An exemplary top-view of an input optical free-space element 180 is schematically illustrated in FIG. 2B. In this example, the input optical free-space element 180 has one input channel 181 which guides a multiwavelength lightwave towards the input optical free-space element's free propagation region. In this free propagation region the lightwave diverges, as indicated in FIG. 2B by the four lines with arrows. This divergent beam is picked up by the foul waveguide channels 182–185 of the waveguide array 186. This waveguide array 186 is part of a tunable lens (not shown in this FIG. 2B).

Figure 2C:
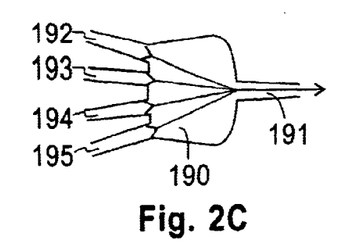
FIG. 2C is a schematic top view of an output optical free-space element.

An output optical free-space element 190 is schematically illustrated in FIG. 2C. This element 190 comprises a waveguide array 196 with four channel waveguides 192–195, a free propagation region, and an output channel 191. A parallel or divergent beam—schematically represented by four lines with arrows—transforms by superposition into a convergent beam in the output optical free-space element 190 if the phase relations in the waveguides of the waveguide array 196 are set correctly. The convergent beam is then coupled into this output channel 191.

Figure 3A:
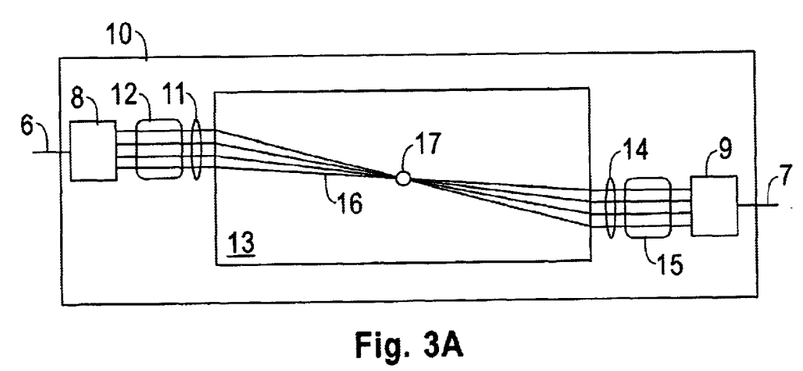
FIGS. 3A–3B are schematic top views of a first switch.
Figure 3B:
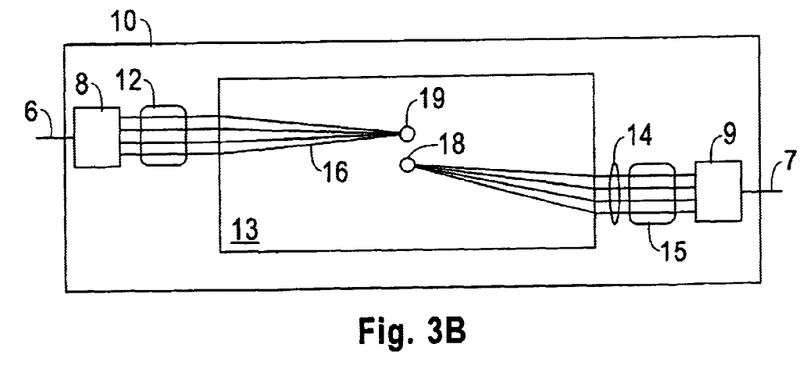

The basic principle of the invention is now described in greater detail in connection with FIGS. 3A and 3B. A 1×1 free-space non-blocking switch 10 is illustrated in these two Figures. FIG. 3A shows the switch 10 in a first switching state (on-state) where the input side is connected to the output side. In other words, in this first switching state a multiwavelength lightwave arriving via the waveguide 6 at the input side is coupled to the waveguide 7 at the output side. In a second state (off-state), the connection between the waveguide 6 at the input side and the waveguide 7 at the output side is interrupted and no coupling between the two sides takes place. This second state is illustrated in FIG. 3B. The switch 10 comprises three optical free-space elements: an input optical free-space element 8, an intermediate optical free-space element 13, and an output optical free-space element 9. In addition, the switch 10 comprises an input tunable optical lens 12 with an input waveguide array 11, and an output tunable optical lens 15 with an output waveguide array 14. The input optical free-space element 8 sits in front of this input tunable optical lens 12 and the output optical free-space element 9 follows after the output tunable optical lens 15.

A lightwave 16 arriving via the input waveguide 6, the input optical free-space element 8, and the input waveguide array 11 with input tunable optical lens 12 is projected into the intermediate optical free-space element 13. The input tunable optical lens 12 interacts with the input waveguide array 11 such that the lightwave 16 in the intermediate optical free-space element 13 can be steered by adjusting the lens 12. Due to the adjustment of the lens 12 one can change the projection characteristic of the input tunable optical lens 12. In FIG. 3A, the input tunable optical lens 12 is adjusted such that the lightwave 16 has a focal point 17 right in the middle of the intermediate optical free-space element 13.

The output tunable optical lens 15 is arranged such that it is able to receive the lightwave 16 from the intermediate optical free-space element 13, provided that its reception characteristic is adjusted accordingly. For this purpose, the output tunable optical lens 15 comprises an output waveguide array 14 and heaters that allow to adjust the reception characteristic so as to (actively) capture the lightwave 16 from the intermediate optical free-space element 13. As illustrated in FIG. 3A, all light from the input waveguide array 11 is focussed at focal point 17 and from there captured by the output waveguide array 14. The output optical free-space element 9 collects the light from the waveguide array 14 into the output channel 7.

In other words, light is switched from the input side to the output side.

Turning now to FIG. 3B, the same switch 10 is shown in a second state, also referred to as off-state. It is obvious that there are various other switching states. In this particular state, the input tunable optical lens 12 is adjusted such that the lightwave 16 has a focal point 19 that is not in the middle of the intermediate optical free-space element 13 anymore. The lightwave 16 was tilted upwards by tuning the input tunable optical lens 12. The output tunable optical lens 15 has not been adjusted in the example which means that the reception characteristic remains the same. The output tunable optical lens 15 has a focal point 18. Since the focal points 18 and 19 are spaced apart, there is no (or almost no) light coupled from the input side to the output side. This explains why this state is also called off-state.

A switch in accordance with the one illustrated in FIGS. 3A and 3B can be used to realize an on/off switch.

Figure 4:
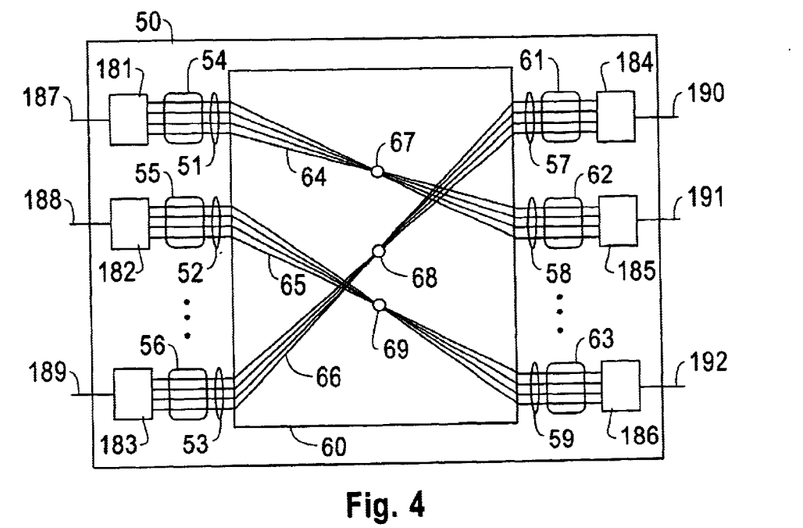
FIG. 4 is a schematic top view of a second switch.

A more sophisticated switch 50 is illustrated in FIG. 4. This switch 50 (optical chip) is an N×N free-space non-blocking switch. It comprises N input channels 187, 188, 189, each having a (small) input optical free-space element 181, 182, 183, and an input tunable optical lens 54, 55, 56 with input waveguide arrays 51, 52, 53. The switch 50 furthermore comprises an intermediate optical free-space element 60, and N output channels 190, 191, and 192. Each output channel has an output tunable optical lens 61, 62, 63 with output waveguide arrays 57, 58, 59 and a (small) output optical free-space element 184, 185, 186. The tunable optical lenses 54, 55, 56 on the input side and the tunable optical lenses 61, 62, 63 on the output side are adjusted Such that a lightwave 64 arriving via the input waveguide array 51 is focussed onto focal point 67 and then captured by the output waveguide array 58. The lightwave 65 is emitted by the input waveguide array 52 into the intermediate optical free-space element 60 and projected onto the focal point 69. The output waveguide array 59 captures the lightwave 65. The lightwave 66 emitted by the N-th input waveguide array 53 is focused onto the focal point 68. The output waveguide array 57 captures this lightwave. Many different switching states can be obtained by tuning/adjusting the input tunable optical lens 54, 55, 56 and output tunable optical lens 61, 62, 63. The input side and output side of this switch 70 are symmetrical. In the snapshot, input channel 187 is connected to output channel 191, input channel 188 is connected to output channel 192, and input channel 189 is connected to output channel 190.

Figure 5:
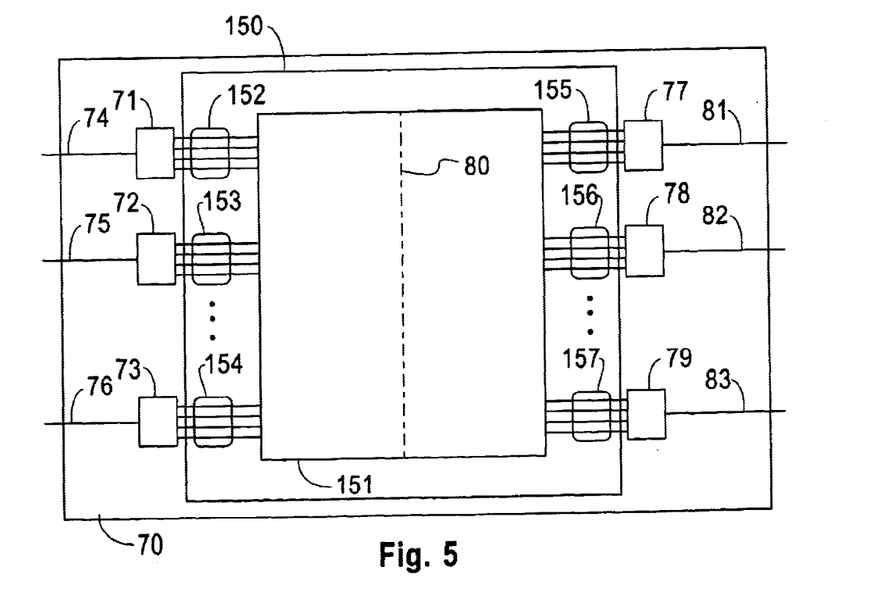
FIG. 5 is a schematic top view of a third switch.

Another embodiment is illustrated in FIG. 5. A switch 70 is shown that comprises N input channels 74–76, N input optical free-space elements 71–73, and N tunable lenses 152–154 with N input waveguide arrays. The switch further comprises an intermediate optical free-space element 151. The switch 70 comprises N output channels 81–83, N output optical free-space elements 77–79, and N tunable lenses 155–157 with N output waveguide arrays. In order to obtain a better separation of adjacent input and output channels (reduced cross-talk), a filtering element 80 is placed in the middle of the free-space element 151. This filtering element 80 sits where the intermediate focal plane of the switch 150 is. It comprises openings at those locations where focal points are. The input waveguide arrays create a real image of the input waveguides in the middle of the intermediate optical free-space element 151 exactly where the openings of the filtering element 80 are. The arrays at the output side can be tuned to actively capture light from those openings. Any higher order diffraction peaks from the waveguide arrays that hit the filtering element 80 outside the openings is suppressed by the filtering element 80. In other words, the filtering element 80 serves as an optical filter. The positions of real images in this intermediate focal plane can be calculated. In case of an N×N switch there are 2×N−1 focus points, i.e., the filtering element 80 would have 2×N−1 openings.

In the following sections, some variations or modifications of the inventive scheme are addressed. The following observations indicate how powerful and flexible the inventive scheme is. It can be used in many different applications.

Figure 6:
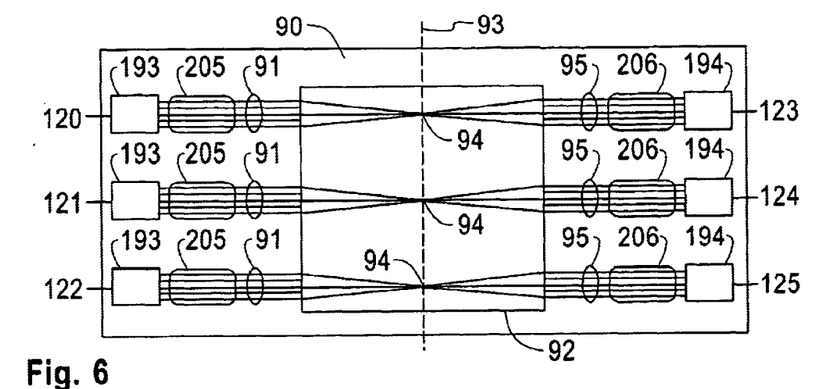
FIG. 6 is a schematic top view of a fourth switch.

In FIG. 6 a symmetrical switch arrangement 90 is shown where there are N=3 input channels 120, 121, 122. Each input channel comprises an input optical free-space element 193 and a tunable lens 205 with five waveguides 91. The switch 90 further has M=3 output channels 123, 124, 125. Each output channel comprises a tunable lens 206 with five waveguides 95 and an output free-space element 194. The waveguides 91 and 95 are arranged with respect to the intermediate optical free-space element 92 such that (1) the focal points all are on the focal plane 93, and (2) such that the focal plane is in the middle of the intermediate optical free-space element 92. The symmetrical switch arrangement has tunable lenses, like the other switches addressed before. These tunable lenses are only schematically illustrated in FIG. 6. FIG. 6 represents a switch state where all tunable lenses are in their off-state, i.e., no beam steering takes place. The light beams enter the intermediate optical free-space element 92, are focussed onto focal points 94 and from there captured by the tunable lenses 95 at the output side. In other words, the switch routes a first lightwave from the uppermost input channel 120 to the uppermost output channel 123. A second lightwave is routed from the input channel 121 in the middle to the output channel 124 in the middle, and a third lightwave is routed from the input channel 122 at the bottom to the output channel 125 at the bottom.

This switch 90 can now be switched into various switch states by adjusting the input tunable optical lenses and/or the output tunable optical lenses. Let us assume for the time being that just the input tunable optical lens of the uppermost input channel 120 is adjusted in order to move the focal point of the uppermost light beam upwards. With all the other tunable optical lenses in the off-states this would mean that the focal point of the uppermost input channel 120 and the uppermost output channel 123 do not coincide anymore. The first lightwave arriving via this channel 120 is not routed to the output channel 123. This particular optical 'link' is interrupted.

Figure 7:
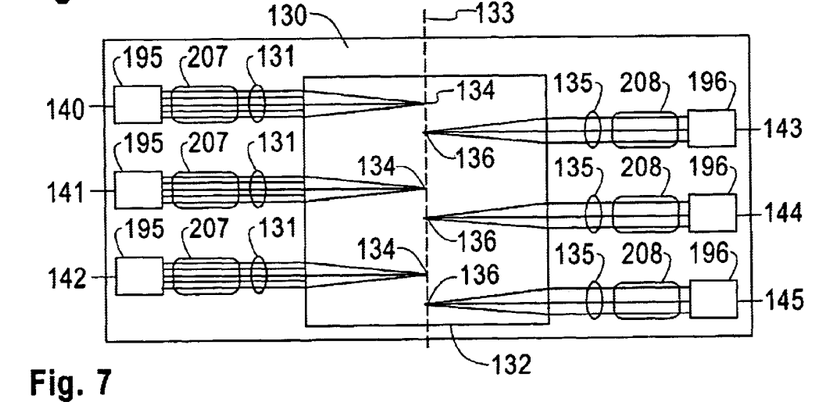
FIG. 7 is a schematic top view of a fifth switch.

In FIG. 7, an asymmetrical switch arrangement 130 is shown that has N=3 input channels 140, 141, 142. Each input channel comprises an input optical free-space element 195 and a tunable lens 207 with four waveguides 131. The switch 130 further has M=3 output channels 143, 144, 145. Each output channel comprises an output optical free-space element 196 and a tunable lens 208 with three waveguides 135. The tunable lenses 207, 208 are arranged with respect to the intermediate optical free-space element 132 such that (1) the focal points all are on the focal plane 133, and (2) such that the focal plane 133 is in the middle of the intermediate optical free-space element 132. The switch arrangement 130 has tunable lenses 207 and 208, like the other switches addressed before. These tunable lenses 207, 208 are only schematically depicted in FIG. 7. All tunable lenses 207, 208 are in their off-state, i.e., no beam steering takes place. The light beams enter the intermediate optical free-space element 132 and are focussed onto focal points 134. The reception characteristic of the output tunable lenses 208 is adjusted such that the focal points 136 do not overlap with the focal points 134. In this switch state no light is captured by the output tunable lenses 208, i.e., the input channels 140, 141, 142 are not coupled to any of the output channels 143, 144, 145. No light travels from the left hand side to the right hand side. The optical links are all interrupted.

This switch 130 can now be switched into various switch states by adjusting the input tunable optical lenses 207 or the output tunable optical lenses 208. Preferably, both the input tunable optical lenses 207 and the output tunable optical lenses 208 are adjusted so as to satisfy the criteria a)–c) for an optimal link, as defined in an earlier section of the detailed description. Let us assume for the time being that just the output tunable optical lens 208 of the uppermost output channel 143 is adjusted in order to move the focal point upwards. With all the-other tunable optical lenses in the off-state this would mean that the focal point of the uppermost input channel 140 and the uppermost output channel 143 coincide and the first lightwave arriving via this channel 140 is routed to the output channel 143. I.e., there exists an optical 'link' between these two channels. All the other optical links still are interrupted.

The switches 90 and 130 both can be switched by adjusting the beam direction in the intermediate optical free-space element.

Figure 8:
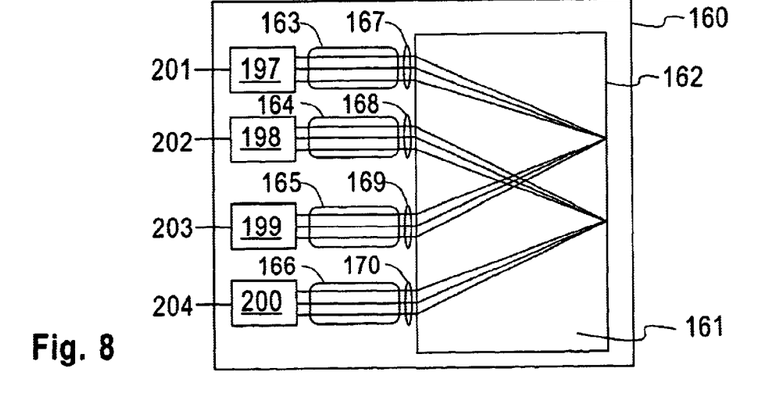
FIG. 8 is a schematic top view of a sixth switch.

Yet another switch design 160 is illustrated in FIG. 8. Instead of an intermediate focal plane, the intermediate optical free-space element 161 has a reflective surface 162. There are two input channels 201, 202 which have input optical free-space elements 197, 198, tunable lenses 163 and 164, and waveguide arrays 167, 168. Furthermore, there are two output channels 203, 204 with output optical free-space elements 199, 200, tunable lenses 165 and 166, and waveguide arrays 169, 170. A first lightwave arriving via the input channel 201 is focused onto the reflective surface 162 from where it is captured by the output channel 203. A second lightwave arriving via the input channel 202 is focused onto the reflective surface 162 from where it is captured by the output channel 204. Such a switch 160 may use less space than the other switches presented herein since the size of the intermediate optical free-space element 161 can be reduced.

The preferred implementation of the invention is illustrated in FIG. 9. This switch 210 is characterized in that its input side is a mirror image of its output side. The switch 210 comprises 8 input channels 212, followed by 8 input optical free-space elements 213, and 8 input tunable lenses 214 with heaters and waveguide arrays. The waveguides of these waveguide arrays are connected/coupled to an intermediate optical free-space element 211. On the opposite side of the free-space element 211, there are 8 output tunable lenses 215 with heaters and waveguide arrays. These 8 output tunable lenses 215 feed light into 8 output optical free-space elements 216 that are coupled to 8 output channels 217. The contact lines for the individual heaters are not shown in FIG. 9.

The switch 210 is made using a high-index-contrast silica-on-silicon integrated planar waveguide technology. The preferred dimensions for switch 210 are given on the top left-hand side of FIG. 9. The input channels 212 and the output channels 217 are separated by 0.1 mm through 0.5 mm, and preferably by about 0.25 mm. The 8 input optical free-space elements 213 and the 8 output optical free-space elements 216 each have a length of 1 mm through 0.1 mm, preferably about 0.5 mm, and a width of 1 mm through 0.1 mm, preferably 0.3 mm. The intermediate optical free-space element 211, however, has a length of 10 mm through 1 mm, preferably about 4 mm, and a width of 10 mm through 0.5 mm, preferably 2.4 mm. The separation of the waveguides at the intermediate optical free-space elements 213, 11, and 216 is between 1 $\mu$m and 20 $\mu$m, preferably about 8 $\mu$m. The heater pads or lines have a length between 1 mm and 10 mm, preferably about 2 mm. The pads are separated between 50 $\mu$m and 500 $\mu$m, preferably by about 100 $\mu$m. The separation of the individual heater arrays is between 100 $\mu$m and 0.1 mm, preferably about 400 $\mu$m.

A high-index-contrast silica-on-silicon integrated planar waveguide technology allows to make waveguides with small bending radii and the switch design can be further optimized to reduce the lateral size.

By slightly defocusing the tunable lens on the input side and/or the tunable lens on the output side, the power throughput to the output channel can be varied without introducing crosstalk to other channels. The switches thus can also be used to adjust the power in the output channels. The heater steering unit may comprise a unit that allows the adjustment of the power in the output channel.

The number of input channels does not have to be equal to the number of output channels. The number of waveguides per waveguide array does not have to be the same on the input side and output side. It is also conceivable that there are a few input channels with five waveguides and a few input channels with six waveguides, for example.

It is possible to use two heaters per waveguide array: one to apply linear phase gradients to adjust the distance of the projected lightwave and one to apply quadratic or higher order phase gradients to adjust the focal length of the projected lightwave.

The fewer heaters one uses, the less complex the heater steering unit and switch control box becomes.

The switch may comprise one or more coupling elements. A v-shaped groove, for example, may serve as a coupling element. Such an element allows the butt-coupling of a fiber to one of the input channels or output channels.

The switch is well suited for integration with a large number of other components on a chip. The switch provides the high functionality which will be used by future telecommunication networks. The invention can be integrated into multiwavelength telecommunication data transmission systems.

What is claimed is:

1. An optical switch, comprising
   an input channel with an input optical free-space element,
   an intermediate optical free-space element,
   an input tunable optical lens with adjustable projection characteristic for projecting a lightwave received from the input optical free-space element into the intermediate optical free-space element,
   an output channel with an output optical free-space element, and
   an output tunable optical lens with adjustable reception characteristic for capturing the lightwave from the intermediate optical free-space element and for feeding the lightwave to the output optical free-space element.

2. The switch of claim, 1, wherein the projection characteristic is adjustable by adjusting the direction or focal length of the lightwave in the intermediate optical free-space element.

3. The switch of claim 1, wherein the reception characteristic is adjustable by adjusting the direction or focal length of the output tunable optical lens.

4. The switch of claim 1, wherein the input tunable optical lens comprises at least one of an input waveguide array and an output waveguide array.

5. The switch of claim 4, wherein the at least one of the input waveguide and output waveguide array comprises waveguides with a waveguide core and claddings.

6. The switch of claim 5, wherein the waveguide core comprises SiON and the claddings comprise $SiO_2$.

7. The switch of claim 5, wherein the ridge waveguide has a thickness between 1 $\mu$m and 3 $\mu$m, and a ridge width between 1 $\mu$m and 5 $\mu$m.

8. The switch of claim 5, wherein one of the input tunable optical lens and the output tunable optical lens comprises tunable heaters.

9. The switch of claim 8, wherein the tunable heaters comprise one of chromium pads and lines that are placed on top of those waveguide arrays where a phase gradient is to be adjusted.

10. The switch of claim 9, wherein one of a linear phase gradient and a non-linear phase gradient between lightwaves traveling in the different waveguides of the waveguide array is obtainable if a current is driven through the tunable heaters.

11. The switch of claim 1, comprising a filtering element with openings.

12. The switch of claim 11, wherein the filtering element is located at the intermediate optical free-space element's intermediate focal plane.

13. The switch of claim 1, comprising N input channels and M output channels, wherein N and M are integer numbers.

14. The switch of claim 13, comprising N input optical free-space elements and M output optical free-space elements.

15. The switch of claim 1 being designed for use in an optical transmission window in a wavelength range between 1540 nm and 1570 nm.

16. The switch of claim 9, comprising a heater steering unit.

17. The switch of claim 16, wherein the heater steering unit comprises a microcomputer to store settings of the tunable heaters.

18. The switch of claim 17, wherein the heater steering unit comprises a unit for the adjustment of the power captured by the output tunable optical lens, by defocusing the input tunable optical lens and the output tunable optical lens.

19. The switch of claim 1, wherein the input tunable optical lens is a mirror image of the output tunable optical lens.

20. The switch of claim 1, comprising a coupling element which allows the butt-coupling of fibers to one of the input channels and output channels.

* * * * *